US007912939B1

(12) United States Patent
Holtey (10) Patent No.: US 7,912,939 B1
(45) Date of Patent: Mar. 22, 2011

(54) METHOD AND APPARATUS FOR SELECTIVELY READING COUNTER INFORMATION IN A NETWORK DEVICE

(75) Inventor: Thomas O. Holtey, Newton, MA (US)

(73) Assignee: AVAYA Inc., Basking Ridge, NJ (US)

( * ) Notice: Subject to any disclaimer, the term of this patent is extended or adjusted under 35 U.S.C. 154(b) by 1438 days.

(21) Appl. No.: 10/661,706

(22) Filed: Sep. 12, 2003

(51) Int. Cl.
*G06F 15/177* (2006.01)
*G06F 15/16* (2006.01)

(52) U.S. Cl. .................. 709/224; 709/221; 709/223

(58) Field of Classification Search .......... 709/51, 709/221–225, 238; 702/179; 235/24
See application file for complete search history.

(56) References Cited

U.S. PATENT DOCUMENTS

| | | | | | |
|---|---|---|---|---|---|
| 4,095,052 | A | * | 6/1978 | Ching et al. | 370/435 |
| 4,912,703 | A | * | 3/1990 | Sumida | 370/235 |
| 5,596,390 | A | * | 1/1997 | Sawada | 399/8 |
| 5,987,507 | A | * | 11/1999 | Creedon et al. | 709/215 |
| 6,304,900 | B1 | * | 10/2001 | Cromer et al. | 709/221 |
| 6,388,930 | B1 | * | 5/2002 | Obremski | 365/201 |
| 6,816,489 | B1 | * | 11/2004 | Patra et al. | 370/390 |
| 6,968,392 | B1 | * | 11/2005 | Wilford et al. | 709/240 |
| 7,007,099 | B1 | * | 2/2006 | Donati et al. | 709/237 |
| 7,215,637 | B1 | * | 5/2007 | Ferguson et al. | 370/230.1 |
| 7,216,160 | B2 | * | 5/2007 | Chintalapati et al. | 709/224 |
| 7,509,656 | B2 | * | 3/2009 | Bian et al. | 719/328 |
| 7,535,833 | B2 | * | 5/2009 | Kozuki | 370/229 |
| 2004/0213370 | A1 | * | 10/2004 | Smallwood et al. | 377/118 |
| 2004/0236866 | A1 | * | 11/2004 | Dugatkin et al. | 709/235 |
| 2008/0008202 | A1 | * | 1/2008 | Terrell et al. | 370/401 |

OTHER PUBLICATIONS

K. McCloghrie, et al. *Management Information Base for Network Managemetn of TCP/IP-based internets: MIB-II*, Internet Engineering Task Force (IETF) Request for Comments (RFC) 1158, Mar. 1991 (66 pages).
K. McCloghrie, et al. *Evolution of the Interfaces Group of MIB-II*, IETF RFC 1573, Jan. 1994 (52 pages).
F. Kastenholz, *Definitions of Managed Objects for the Ethernet-like Interface Types*, IETF RFC 1643, Jul. 1994 (18 pages).
S. Baldbusser, *Remote Network Monitoring Management Information Base*, IETF RFC 1757, Feb. 1995 (85 pages).

* cited by examiner

*Primary Examiner* — Joshua Joo
(74) *Attorney, Agent, or Firm* — Anderson Gorecki & Manaras LLP (57) ABSTRACT

Ripeness indicators are provided and associated with statistics counters to enable the counters to be read once sufficient data has accumulated in the counters. The ripeness indicators may be used to signal to the network device when one or more counters has met or exceeded a predetermined value, such as 50%. Monitoring ripeness indicators associated with the counters enables the network device to harvest counters when they are sufficiently full to gather meaningful statistics from the counters, while ignoring counters that do not contain sufficient data or are not in danger of overflowing. This enables the network device to devote less resources to statistics gathering since high volume counters may be harvested more frequently than low volume counters. The ripeness indicators may be provided with individual counters, groups of counters, or accounts containing individual and/or groups of counters.

9 Claims, 4 Drawing Sheets

METHOD AND APPARATUS FOR SELECTIVELY READING COUNTER INFORMATION IN A NETWORK DEVICE

BACKGROUND OF THE INVENTION

1. Field of the Invention

The present invention relates to communication networks and, more particularly, to a method and apparatus for selectively reading counter information in a network device.

2. Description of the Related Art

Data communication networks may include various routers, switches, nodes, hubs, proxies, and other network devices coupled to and configured to pass data to one another. These devices will be referred to herein as "network devices." Data is communicated through the data communication network by passing data packets (or data cells, frames, or segments) between the network devices by utilizing one or more communication links between the devices. A particular packet may be handled by multiple network devices and cross multiple communication links as it travels between its source and its destination over the network.

As networks become more complex and the amount of traffic passing over the networks increases, the number of aspects of the network and the number of packets flowing through the network that must be monitored, or metered, also increases. For example, a router with 8 line cards, each of which is capable of supporting 30 Gigabits/sec, may handle over 60 million packets per second. The router/switch may also be responsible for keeping statistics on over 500 different aspects of the various flows being handled by the router/switch. For example, statistics may be collected on a per-VLAN basis, based on a combination of the physical port number, MAC source or MAC destination address, 802.1p Quality of Service (QoS) settings, and cast type such as unicast, multicast, or broadcast. The statistics may also relate to queuing, such as related to committed information rate for conforming bytes and packets, peak rate for conforming bytes and packets, and discards (bytes and packets). Numerous other statistics may be maintained as well, and the counters may be programmable to enable a given counter to be used for more than one purpose depending on the application for which the router/switch is to be utilized.

Since counters are typically limited in size by the hardware used to implement the processor, conventional network devices require the statistics to be harvested from all counters at least once in a given time period, such as once every 0.01 seconds. Unfortunately, the high volume of packets combined with the large number of counters requires the network device to dedicate considerable resources to statistics gathering and analysis. Moreover, many of the statistics counters may be relatively unpopulated even though one or more of the counters is in danger of overflowing. Accordingly, it would be advantageous to alter the statistics gathering paradigm to reduce the overhead associated with gathering information from counters to generate statistics.

SUMMARY OF THE INVENTION

The present invention overcomes these and other drawbacks by providing an apparatus and method for ascertaining when a statistics counter contains sufficient data to warrant gathering statistics from that counter or group of associated counters. In one embodiment, a ripeness indicator is used to signal to the network device when one or more counters has met or exceeded a predetermined value. Monitoring ripeness indicators associated with the counters enables the network device to harvest counters when they are sufficiently full to gather meaningful statistics from the counters, while ignoring counters that do not contain sufficient data or are not in danger of overflowing. This enables the network device to devote less resources to statistics gathering since high volume counters may be harvested more frequently than low volume counters.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, the method and apparatus of the present invention enable statistics to be collected from individual counters or groups of counters according to the rate of fill or fill level of the counters. By collecting statistics as needed, it is possible to reduce the number of statistics harvesting operations while still maintaining an adequate level of statistics collection to reduce the likelihood that one or more counters will overflow.

Figure 1:
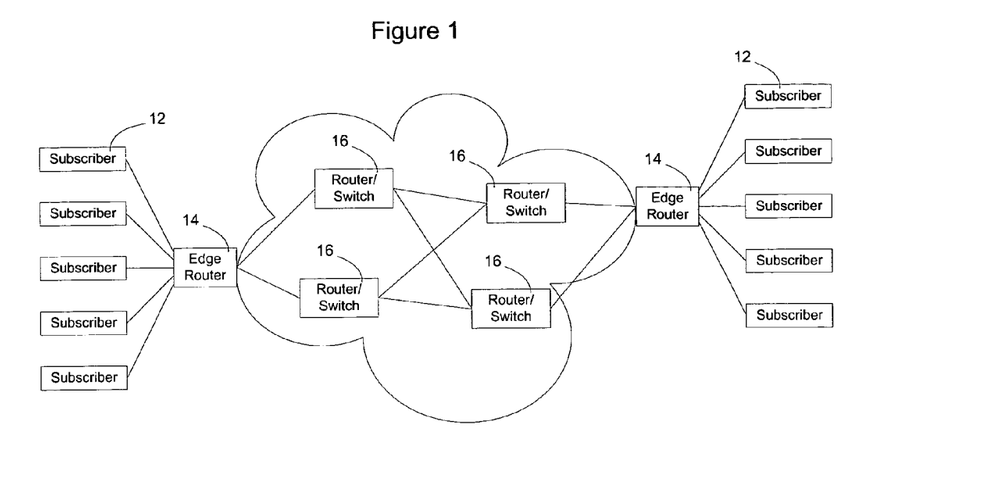
FIG. 1 is a functional block diagram of an example of a network architecture.

FIG. 1 illustrates one example of a communication network 10. As illustrated in FIG. 1, subscribers 12 access the network by interfacing with a network element such as an edge router 14 or other construct typically operated by an entity such as an internet service provider, telephone company, or other connectivity provider. The edge router collects traffic from the subscribers and multiplexes the traffic onto the network backbone, which includes multiple routers/switches 16 connected together. Through an appropriate use of protocols and exchanges, data may be exchanged with another subscriber or resources may be accessed and passed to the subscriber 12. Aspects of the invention may be utilized in the edge routers 14, routers/switches 16, or any other network device utilized on communications network 10.

Figure 2:
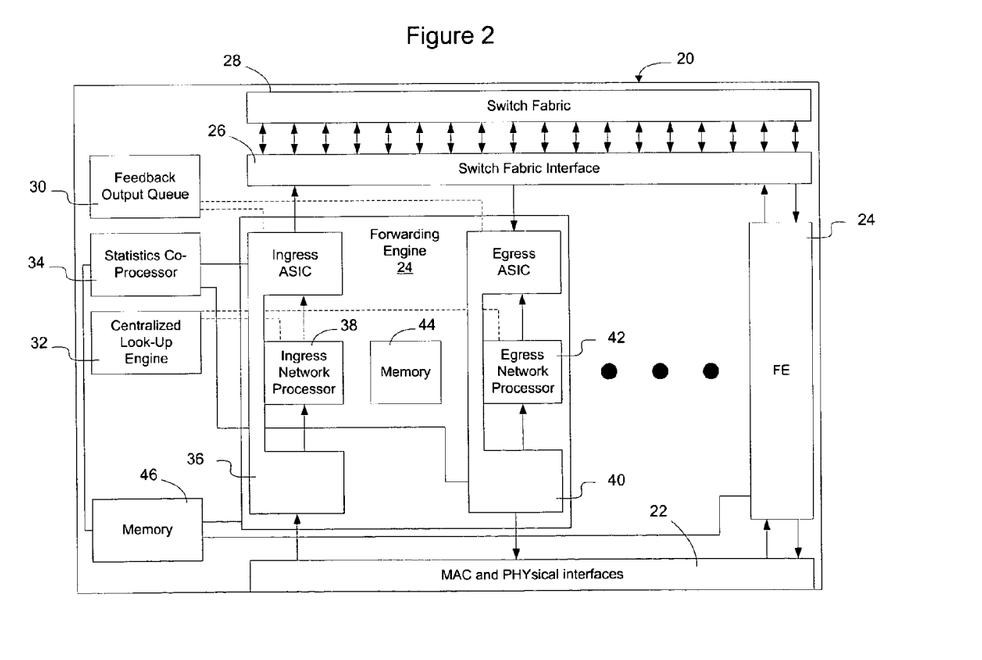
FIG. 2 is a functional block diagram of a network device according to an embodiment of the invention.

FIG. 2 illustrates one embodiment of a network device 20 that may be configured to implement embodiments of the invention. The invention is not limited to a network device configured as illustrated, however, as the invention may be implemented on a network device configured in many different ways. The discussion of the specific structure and methods of operation of the embodiment illustrated in FIG. 2 is intended only to provide one example of how the invention may be used and implemented in a particular instance. The invention more broadly may be used in connection with any network device configured to collect statistics on a communications network. The network device of FIG. 2 may be used as an edge router 14, a router/switch 16, or another type of network device on a communication network such as the communication network described above in FIG. 1.

As shown in FIG. 2, a network device 20 generally includes interfaces 22 configured to connect to links in the communications network. The interfaces 22 may include physical interfaces, such as optical ports, electrical ports, wireless ports, infrared ports, or ports configured to communicate with other conventional physical media, as well as logical elements configured to operate as MAC (layer 2) ports.

One or more forwarding engines 24 are provided in the network device to process packets received over the interfaces 22. A detailed description of the forwarding engines 24 and the functions performed by the forwarding engines 24 will be provided below in connection with FIG. 3.

The forwarding engine 24 forwards packets to the switch fabric interface 26, which passes the packets to the switch fabric 28. The switch fabric 28 enables a packet entering on one of the interfaces 22 to be output at a different interface 22 in a conventional manner. A packet returning from the switch fabric 28 is received by the forwarding engine 2 and passed to the interfaces 22. The packet may be handled by the same forwarding engine 24 on both the ingress and egress paths. Optionally, where more than one forwarding engine 24 is included in the network device 20, a given packet may be handled by different forwarding engines on the ingress and egress paths. The forwarding engines may be supported by one or more elements configured to perform specific functions to enhance the capabilities of the network device. For example, the network device may include a feedback output queue element 30 configured to assist in queue management, a centralized look-up engine 32 configured to interface memory tables to assist in rouging decisions, and a statistics co-processor 34 configured to gather statistics and put them in Management Information Base (MIB)-readable form. The MIB may be maintained in internal memory 44 or external memory 46. The invention is not limited to any particular interface 22, forwarding engine 24, switch fabric interface 26, or switch fabric 28, but rather may be implemented in any suitable network device configured to keep statistics on data flows through a network.

The forwarding engine 24 maintains counters associated with variables to be monitored on the network. For example, it may be desirable to collect statistics on a per-VLAN basis, based on a combination of the physical port number, MAC source or MAC destination address, 802.1p QoS settings, and cast type such as unicast, multicast, or broadcast. The statistics may also relate to queuing, such as related to committed information rate for conforming bytes and packets, peak rate for conforming bytes and packets, and discards (bytes and packets). Numerous other statistics may be maintained as well, and the counters may be programmable to enable a given counter to be used for more than one purpose depending on how the edge router or router/switch is to be utilized. The counters may be internal to the forwarding engine or external to the forwarding engine, such as in memory 46 or other portions of the network device 20.

In the embodiment illustrated in FIG. 2, the statistics co-processor 34 is configured to gather statistics associated with packets handled by the network device 20. In one embodiment, the statistics may be deduced by harvesting information from the counters maintained by the forwarding engine 24. For example, the forwarding engine may maintain a counter for packets handled by the network device and another counter for packets dropped by the network device. Harvesting the values maintained in these counters enables the co-processor to ascertain what percentage of packets handled by the network processor are being dropped. This is just a very simple example. In actual practice a forwarding engine may maintain hundreds or thousands of counters associated with various aspects of packet flow through the network. The invention is not limited to implementation of a particular counter or set of counters for a particular application or utilization of the information in those counters to present a particular statistic. The invention is also not limited to an embodiment where the counters are maintained by the forwarding engine, as counters may be maintained by other portions of the network device as well or in lieu of the forwarding engine 24.

Figure 3:
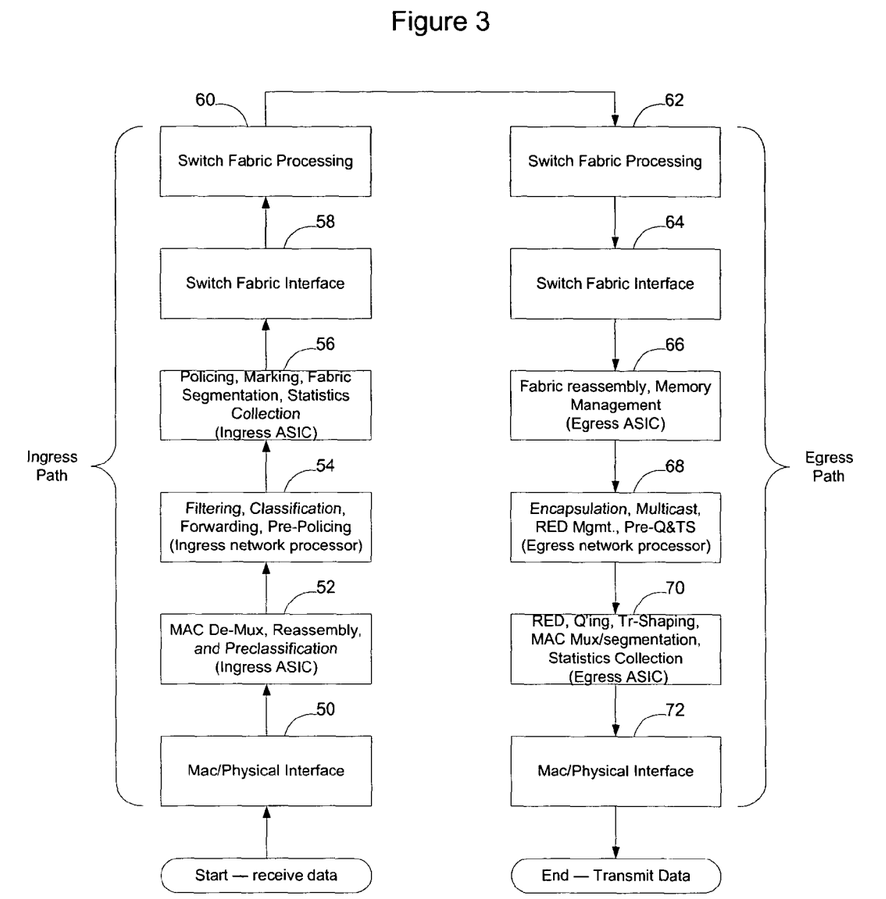
FIG. 3 is a flowchart of an example of how a packet is handled by the network device illustrated in FIG. 2.

FIG. 3 illustrates in greater detail the processes performed on a packet as the packet passes through the network device of FIG. 2. The invention is not limited to processing packets as similar operations may take place on segments, frames, or other logical associations of data bits and bytes of data. As shown in FIG. 3, in this embodiment, packets generally travel through the forwarding engine two times—utilizing an ingress path and utilizing an egress path. The network device may utilize counters to enable statistics collection on either the ingress path or the egress path, or optionally on both paths.

As shown in FIG. 3, on the ingress path, data arrives at the MAC/PHYsical interface 22 (50) and is passed to the ingress ASIC (Application Specific Integrated Circuit) 36. The ingress MAC device receives data from the PHY device that provides the physical interface for a particular interface or set of supported interfaces. After physical reception and checking, the MAC device transfers packets to the ingress ASIC.

The ingress ASIC 36 pre-processes the data by de-multiplexing the data, reassembling packets, and preclassifying the packet (52). In one embodiment, the ingress ASIC responds to fullness indications from the MAC device and transfers complete packets to the ingress network processor. It services contending MAC interfaces in a round robin fashion, or utilizing any other conventional arbitration scheme. Optionally, packets arriving at the MAC interface may be buffered prior to being transferred to the ingress network processor.

The ingress ASIC may preclassify packets to accelerate processing of the packets in later stages by other constructs within the network device. According to one embodiment, the ingress ASIC examines the MAC and IP headers and records a variety of conditions to assist the ingress network processor 38 in processing the packets. For example, the ingress ASIC may examine the MAC address of the packet, may identify the protocol or protocols being used in formation and/or transmission of the packet, and examine the packet for the presence of a congestion notification. The results of the pre-classification are prepended to the packet in a preamble.

The packet is then forwarded to the ingress network processor 38. The ingress network processor 38 implements rules to make filtering decisions for packets meeting particular criteria, classifies the packet, makes initial policing decisions, and makes forwarding decisions associated with the packet (54).

For example, in one embodiment, the ingress network processor executes lookups in coordination with the centralized lookup engine 32, performs filtering and classification operations, and modifies the IP and MAC headers within the body of the packet to reflect routing and switching decisions. The ingress network processor also creates information that is not contained within the packet but that is needed to complete the packet processing. This information is may be placed in the packet preamble or within the packet header.

The ingress network processor identifies an account to be used for policing and marking by the ingress ASIC. Optionally, policing and marking could take place in the ingress network processor, although in the illustrated embodiment policing and marking takes place at a later stage by the ingress ASIC. In the illustrated embodiment, the ingress network processor determines the packets class and records it in three QoS bits. The ingress network processor may also determine its marking and record it in out of profile indicators associated with the packet. This marking is subsequently used by and may be overwritten by the policing function and/or the congestion dialog.

The ingress network processor 38 also determines the information needed by the switch fabric to carry the packet to the correct egress point. For example, the ingress network processor may ascertain the TAP, PID (slot address and sub-address) and the physical egress port to which the packet is to be routed/switched. Optionally, the ingress network processor may determine and record the egress queue ID as part of the lookup process and pass it to the egress processor (discussed below) to further facilitate end-to-end QoS.

The packet is then passed to the ingress ASIC which implements the policing and filtering decisions, marks the packet according to the packet classification, and performs packet segmentation to prepare packets to be passed to the switch fabric interface 26 (56). In one embodiment, policing and marking of each packet are performed against one or more credit mechanisms such as token buckets. Following this function, a dialog takes place with a congestion manager (not shown) to determine the packet's disposition. As a result of this dialog, the packet may be dropped or re-marked by overwriting the out of profile indicators. The packet may also be dropped or modified if warranted.

The packet is then segmented for the fabric. The cell and packet headers and trailers are completed and formatted. The packet preamble may be discarded at this stage as the information contained in the packet preamble is no longer needed by the ingress ASIC or ingress network processor. Once the packets are segmented, the packets are passed to the switch fabric interface 26 (58) and then to the switch fabric 28 for processing (60). The switch fabric transports the packet from its ingress point to the egress point (or points) defined by the ingress network processor.

On the egress path, after the packet has exited the switch fabric 28 (62) the packet is passed back to the switch fabric interface (64), which passes the packet to the egress ASIC 40. The egress ASIC 40 reassembles the packet (if it was segmented prior to being passed to the switch fabric 28) and performs memory management to manage output queues (66). During reassembly, the information in the cell headers and trailers is recorded in a packet preamble. A packet header extension may be present and, if so, is passed to the egress network processor. The memory requirements for reassembly are determined by the number of contexts, packet size, and potential bottleneck(s) to the egress network processor due to, for example, whether the packet or other packets are to be multicast, etc. Following reassembly, packets are queued for output to the egress network processor. Packets are retrieved from the egress queues for processing according to any arbitration scheme.

The packet is then passed to an egress network processor 42 which performs multiple functions associated with preparing the packet to be again transmitted onto the network. For example, the egress network processor 42 may encapsulate the packet, perform operations to enable the packet to be multicast (transmitted to multiple recipients), perform Random Early Drop (RED) management, and perform initial queuing and traffic shaping operations (68). Specifically, the egress network processor uses the MAC and IP packet headers, along with the QoS bits to specify the egress queue, or "flow," for use by the queuing and traffic shaping function. This information is coded in the packet preamble.

The packet is then passed to the egress ASIC to be queued prior to being passed to the MAC/PHYsical interfaces 22 for re-transmission onto the network (70). In addition to queuing packets, the egress ASIC performs traffic shaping. Counters may be maintained in the egress ASIC to enable statistics to be gathered from the queues, on a per-flow basis, or from any other metric of interest. The amount of memory required to store packets prior to transmission onto the network depends on many factors, such as the desired queue lengths, the number of queues (flows), and the amount of time information must be maintained in the queue for potential retransmission. The amount of time packets should be maintained in a queue may be determined, in a TCP network, in a known fashion by ascertaining the round trip time (TCP-RTT).

The packets are then passed to the MAC/PHYsical interfaces 22 for retransmission onto the network (72). The MAC interface multiplexes the packet onto the physical interface that places the data onto the link to be transmitted to another network device.

As discussed above, one or more elements of the network device may maintain counters to enable the network device to perform statistical analysis of packets passing through the network device. Statistics counters must be read and cleared periodically to prevent the counters from filling and to enable meaningful data to be retrieved from the counters. If counter registers of uniform size are used, the required frequency of harvesting information from the counters will vary from account to account as a result of uneven traffic distribution.

According to an embodiment of the invention, a ripeness indicator is associated with each counter or with groups of counters to enable counters to be harvested before they overflow, but not unnecessarily when they contain little data. Reading counters when ripe—after receiving a particular amount of data—reduces the number of counters that must be read in any one period of time. For example, assume that a network device is processing 10 Gigabits/sec (Gbps) of data, and that 9 Gbps of that data belongs to one account. If there are 500 accounts, it can be expected that the counters associated with the other accounts will contain relatively small values compared to the counters associated with the one very busy account. If all counters are harvested every time the busy account counters are in danger of overflowing, the network device will expend considerable resources harvesting relatively small numbers from underutilized counters. By contrast, providing ripeness indicators, according to the invention, enables only those counters in danger of overflowing to be harvested. Thus, in the above example, the one account handling most of the traffic may have its counters harvested more frequently than the counters associated with the other accounts, which enables network resources to be conserved.

Utilization of ripeness counters to govern harvesting of data from counters may be implemented in many different ways. For example, a ripeness indicator may be associated with each account, and each account may have several counters counting different aspects of the flow through that account. In this embodiment, for example, the ripeness indicator could be associated with a total packet, total byte, or total bit counter. When a sufficiently large number of packets/bytes/bits is processed for that account, the ripeness indicator for that account may be set indicating to the network device that it is time to harvest values from the counters associated with that account.

In the embodiment of FIG. 2, as described in greater detail below in connection with FIG. 7, the ripeness indicator may be a bit associated with an account that is set when a primary counter, such as a counter assigned to count the total packets or bytes handled by a network device for that account, reaches a particular level. For example, ripeness indicator (bit) may be set when the most significant bit of the primary counter is set to "1." Other counters (secondary counters) associated with the account, that are configured to monitor a specific aspect of the packets handled by the network device for that account, need not be monitored as their content is necessarily smaller than that of the primary counter. The secondary counters should be read to in connection with the primary counter, however, to ensure that this condition persists. The ripeness bit is reset when these statistics counters are read or "harvested" as that term is used herein. The invention is not limited to this particular embodiment however as any threshold value may be set as an indication that the counters are ripe for harvesting.

The statistics counters may be maintained for each account, or only for a subset of accounts. Statistics counters may be sticky, meaning that they do not wrap to zero but stay at their maximum value once the maximum value has been reached. Alternatively, the statistics counters may be allowed to wrap to zero once they overflow. By causing the ripeness bit to be set when the counters wrap and enabling the counters to wrap to zero, the effective size of the counters may be doubled, thus reducing the overhead associated with harvesting statistics, without losing resolution in the statistical analysis. The statistics counters in the embodiment of FIG. 2 are readable by the statistics co-processor and are cleared when read. Reading of counters within a given account is synchronized to ensure all values are consistent. Since accounts are being read at different times throughout the runtime of the network device, however, there is no guarantee of consistency between accounts on a fine time-frame basis.

Figure 4:
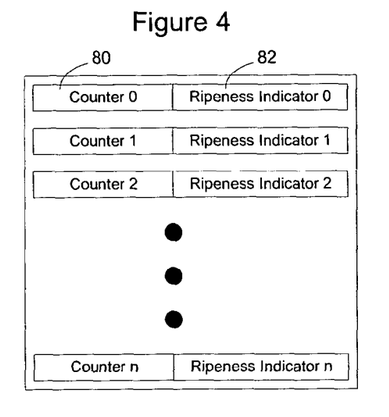
FIGS. 4-6 are functional block diagrams of counter systems according to embodiments of the invention.
Figure 5:
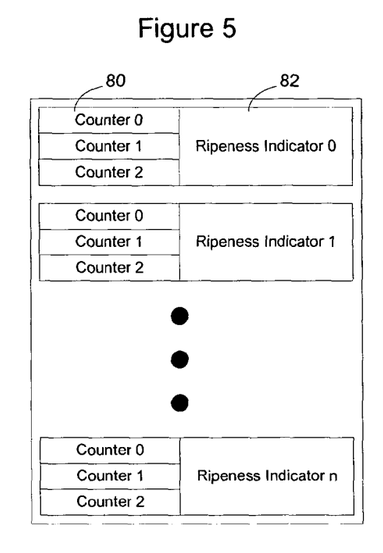
Figure 6:
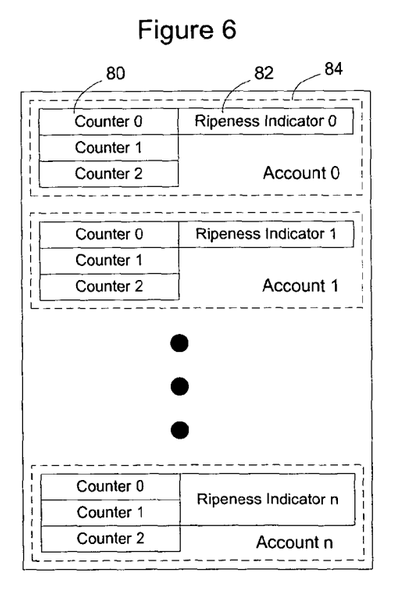

FIGS. 4-6 illustrate embodiments of the invention in which a ripeness indicators are associated with statistics counters (FIG. 4), groups of statistics counters (FIG. 5), or accounts containing statistics counters (FIG. 6). In operation, a network device may include one or more of these embodiments, or another logical association between statistics counters and ripeness indicators, and the invention is not limited to a network device implementing one or more of the illustrated embodiments.

As shown in FIGS. 4-6, each ripeness indicator may be associated with a particular counter, a group of counters, or an account. Preferably, the ripeness indicators will be associated with counters that are logically or in some way related to facilitate condensation of the information gleaned from the counters into usable statistics by the statistics coprocessor. The number of ripeness indicators affects the granularity with which the counters may be harvested. Specifically, a large number of ripeness indicators enables more focused harvesting of specific counters that are in danger of overflowing. Potential disadvantages to utilizing large numbers of ripeness indicators include increased processor resources that must be expended to monitor the large number of ripeness indicators, as well as an increased likelihood that not all counters required by the statistic co-processor 30 will be harvested simultaneously. By contrast, a smaller number of ripeness indicators, each associated with a relatively larger number of counters, reduces the overhead associated with monitoring ripeness indicators but may cause counters to be harvested prematurely.

In the embodiment illustrated in FIG. 4, each counter 80 is associated with a ripeness indicator 82. This enables each counter 80 to be individually monitored and harvested by the network device when necessary. FIG. 5 illustrates an embodiment in which several counters 80 are associated with one ripeness indicator 82. In this embodiment, whenever any one of the counters 80 reaches a predetermined level, which may be different for each counter, the ripeness indicator 82 is set. Setting of the ripeness indicator 82 indicates to the network device 20 that the counters 80 are to be harvested. Associating multiple counters with a given ripeness indicator enables counters to be easily associated with each other and enables consistency to be maintained between particular subsets of counters.

FIG. 6 illustrates another embodiment of the invention in which counters 82 are associated with accounts 84, but where a ripeness indicator 82 is only associated with one or a subset of the counters 80 associated with that account 84. Accordingly, in the embodiment of FIG. 6, the ripeness indicator 82 of an account 84 will only be set when a particular counter 80 associated with that account 84 reaches a predetermined level. Thus, for example, ripeness indicator 0 associated with account 0 will only be set when the level of counter 0 in account 0 reaches a predetermined level. By contrast, the ripeness indicator 0 of FIG. 5 would be set whenever one of counters 0, 1, or 2 reached a predetermined level. This embodiment of FIG. 6 thus enables logical associations to be made between counters and reduces the monitoring required to harvest the associated counters. The ripeness indicator preferably should be associated with the counter configured to monitor the largest expected amount of traffic among the associated counters to prevent overflow from occurring in any of the non-monitored counters.

Figure 7:
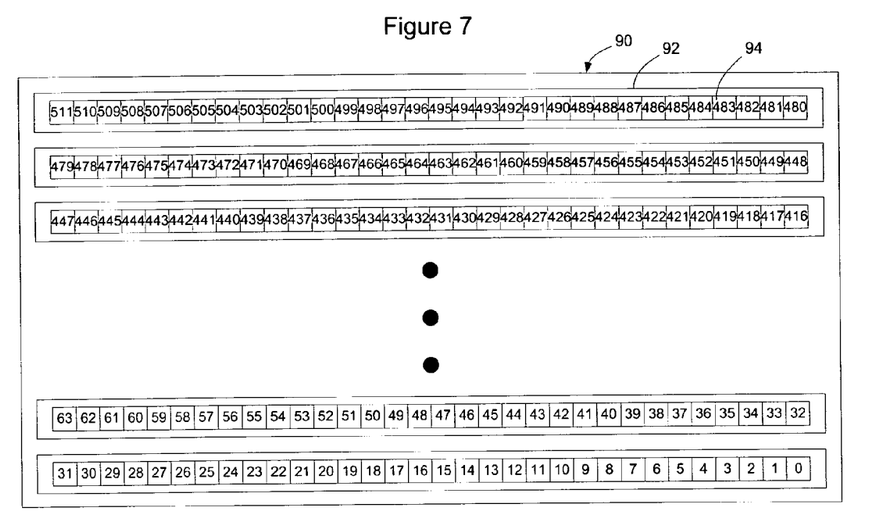
FIG. 7 is a functional block diagram of a ripeness indicator array according to an embodiment of the invention.

The ripeness indicators may be stored in an array such as the array 90 illustrated in FIG. 7. The array 90 may be stored in a memory subsystem 44 of the forwarding engine 24, in a memory subsystem 46 external to the forwarding engine and accessible by all forwarding engines, or in other memory within or external to network device 20. The invention is not limited to a particular storage area for maintaining the ripeness indicators or to a particular way of storing ripeness indicators.

In the embodiment illustrated in FIG. 7, the array 90 contains direct addressable words 92, each of which contain 32 bits 94. Each bit 94 in this embodiment is a ripeness indicator for a particular account, enabling the network device to handle up to 512 individual accounts, or flows. Each account may include one or more statistics counters as discussed above in connection with FIGS. 4-6.

When a statistics counter associated with an account reaches a threshold value, such as half of its maximum capacity, the bit 94 associated with the account in the appropriate word is set. The bit, in this embodiment, is an indicator that the counters associated with that account are ready to be harvested. Although the ripeness indicators in this embodiment have been described as being one bit, indicative of a level of data contained in the associated counters, the invention is not limited in this respect. For example, two bits may be used to describe the ripeness level of a given counter or set of counters, such as to indicate to the network device that the counter(s) associated with the ripeness indicator are, e.g., 50%, 70%, or 90% full. Utilizing a more complicated ripeness indicator enables the network device to selectively harvest counters and give priority to counters that are in the greatest danger of overflowing.

To harvest statistics, the statistics coprocessor 34 first ascertains which accounts are ripe for harvesting, and then proceeds to access counters for those ripe accounts. For example, the statistics coprocessor 34 may periodically read ripeness indicators, or one or more of the ripeness indicators may cause an interrupt, triggering reading of one or more, or all, or a particular subgroup of the ripeness indicators. For example, the statistics coprocessor according to one embodiment retrieves a first word 92, ascertains from the set bits 94 which accounts contain counters that need to be read and cleared, and proceeds to harvest statistics from counters associated with those accounts. Once the counters have been harvested, they are reset to 0 or another pre-defined number and the word 92 is reset to a default value, such as all zeros. The statistics co-processor iteratively retrieves subsequent words and processes them in a similar fashion to the first word. Upon reaching the end, the statistics co-processor repeats the process starting with the first word. Although in this embodiment the statistics co-processor retrieves one word at a time starting with the first word, the invention is not limited to this embodiment. Accordingly, the invention encompasses other embodiments such as where the statistics co-processor retrieves a subset of words and processes the subset, retrieves the entire array and processes the entire array, or retrieves and processes bits in an order different than described above.

The level sufficient to trigger a ripeness indication may be pre-set and uniform for all accounts. For example, the level may be set to 50%, 75%, or some other number determined based, at least in part, on the speed with which the statistics co-processor is able to harvest statistics from the accounts. Alternatively, the level may be dynamically adjusted by a dynamic ripeness level adjuster, as illustrated in FIG. 8.

Figure 8:
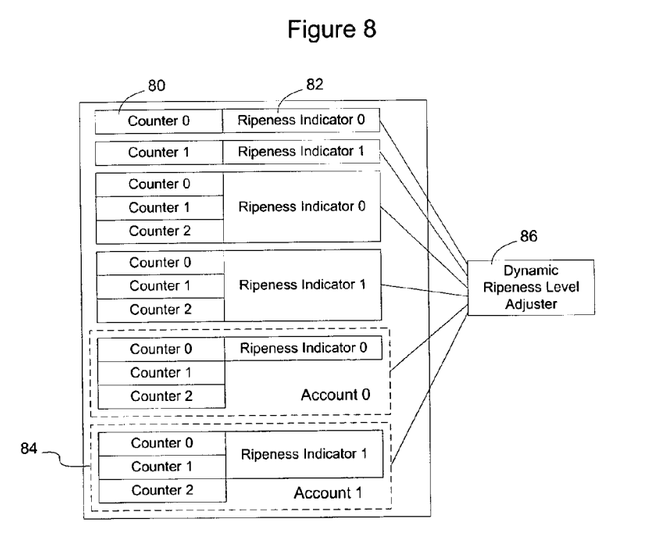
FIG. 8 is a functional block diagram of a counter system including a dynamic ripeness level adjustor according to an embodiment of the invention.

FIG. 8 illustrates a set of ripeness indicators 82 associated with accounts, individual counters, or groups of counters. Certain accounts may have very little traffic such that it is permissible to allow the counters to build up to 90%+ of capacity without overdue concern that they will overflow. Harvesting these counters every time the counters build up to 50% of capacity results in expenditure of resources in excess of that necessary to service that particular set of counters. Implementation of a dynamic ripeness level adjuster 86 allows the ripeness level of the ripeness indicators 82 to be adjusted based on historical usage levels, current usage levels, and other variables associated with the network device and the account, to set the ripeness levels at appropriate levels for the particular accounts or counters. By adjusting the ripeness levels to account for current, past, and forecast traffic patterns, it thus may be possible to reduce the amount of processor resources utilized to harvest data from counters. The dynamic ripeness level adjuster 86 may be associated with the statistics co-processor 34, the forwarding engine 24, or another construct in the network device 20.

The control logic of the ingress network processor 38 and egress network processor 42 of network device 20 may be implemented as a set of program instructions that are stored in a computer readable memory 44 within a forwarding engine 24 on network device 20, computer readable memory 46 external to the forwarding engines 24 of network device 20, or another computer readable memory. However, it will be apparent to a skilled artisan that all logic described herein can be embodied using discrete components, integrated circuitry, programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for selectively reading counter information in a network device, the method comprising the steps of:

selectively setting ripeness indicators in an array of ripeness indicators, each of the ripeness indicators in the array including one or more bits and being associated with one or more of the counters and, when set, indicating that a value of at least one of the associated one or more counters has exceeded a threshold value, each of the counters containing information associated with statistics of traffic being handled by the network device;

deciding which counters to read and which counters to not read by reading the array of ripeness indicators to determine a subset of the counters that have fullness levels above the subset of counters' respective thresholds; and reading only the subset of counters determined from reading the array of ripeness indicators; and iterating the steps of selectively setting ripeness indicators in the array of ripeness indicators, reading the array of ripeness indicators, and reading only the subset of counters determined from reading the array of ripeness indicators, wherein only counters identified as having fullness levels above respective thresholds by the ripeness indicators are harvested by the network device and counters not identified as having fullness levels above respective thresholds are skipped and not harvested by the network device.

2. The method of claim 1, further comprising resetting the ripeness indicators after reading the subset of the counters.

3. The method of claim 1, further comprising dynamically adjusting the respective thresholds.

4. A network device, comprising:

a forwarding engine including memory configured to process data traffic received by the network device;

a plurality of counters configured to monitor and contain aspects of data traffic received by the network device;

an array of ripeness indicators, each of the ripeness indicators in the array including one or more bits and being associated with one or more of the plurality of counters, each of the ripeness indicators being indicative of a fullness level of the one or more of the plurality of counters with which the said each of the ripeness indicators is associated and indicating that the fullness level of the one or more of the plurality of counters has exceeded a respective threshold of the associated counter; and control logic configured to decide which counters to read and which counters to not read by reading the array of ripeness indicators to determine a subset of the plurality of counters that have fullness levels above the subset of the plurality of counters' respective thresholds, the control logic being further configured to harvest information only from counters in the subset of the plurality of counters determined from reading the array of ripeness indicators; and wherein the control logic is further configured to iteratively read the array of ripeness indicators and harvest only the subset of counters determined from reading the array of ripeness indicators, to cause only counters identified by the ripeness indicators as having fullness levels above respective thresholds to be harvested by the network device and to cause counters not identified as having fullness levels above respective thresholds to be skipped and not harvested by the network device.

5. The network device of claim 4, wherein every bit in the array of ripeness indicators represents at least one of said plurality of counters.

6. The network device of claim 4, wherein the control logic is part of the forwarding engine.

7. The network device of claim 4, further comprising a switch fabric connected to the forwarding engine.

8. The network device of claim 4, further comprising a statistics coprocessor configured to interface with said plurality of counters and said control logic to enable statistics to be generated from values harvested from said plurality of counters.

9. A network device, comprising:
a forwarding engine including memory configured to process data traffic received by the network device;
a plurality of counters configured to monitor and contain aspects of data traffic received by the network device;
an array of bits implementing a plurality of ripeness indicators, each of the ripeness indicators being associated with one or more of the plurality of counters, each of the ripeness indicators being indicative of a fullness level of the one or more of the plurality of counters with said each of the ripeness indicators is associated and indicating that the fullness level of the one or more of the plurality of counters has exceeded a threshold; and
control logic configured to iteratively read the array of ripeness indicators to decide which counters to read and which counters to not read by determining a subset of the plurality of counters that have fullness levels above the subset of the plurality of counters' respective thresholds, the control logic being further configured to read, after reading the array of ripeness indicators, only the subset of the plurality of counters that were determined to have fullness levels above the subset of the plurality of counters' respective thresholds wherein only counters identified by the ripeness indicators as having fullness levels above respective thresholds are harvested by the network device and counters not identified as having fullness levels above respective thresholds are skipped and not harvested by the network device;
wherein the forwarding engine maintains the plurality of counters.

* * * * *